Patented Nov. 28, 1922.

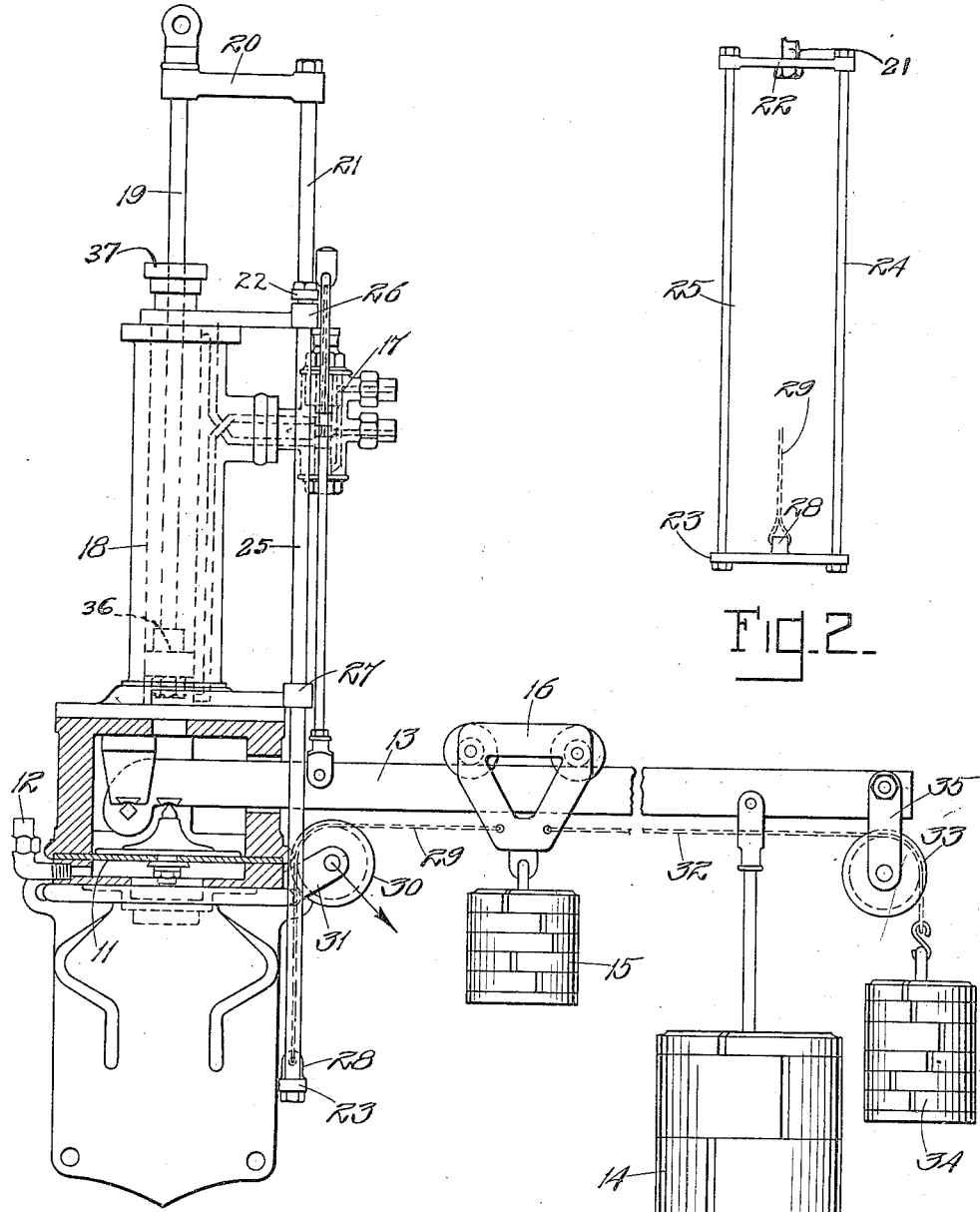

1,436,973

UNITED STATES PATENT OFFICE.

GEORGE S. MELCHER, OF SHARON, MASSACHUSETTS, ASSIGNOR TO CHARLES W. McCONNEL, OF BOSTON, MASSACHUSETTS, ELDON MACLEOD, LESLIE SOULE, OF WESTWOOD, MASSACHUSETTS, FANNIE B. LOOK, OF NORTHAMPTON, MASSACHUSETTS, AND CAMERON MACLEOD, OF PHILADELPHIA, PENNSYLVANIA, TRUSTEES, DOING BUSINESS UNDER THE NAME OF THE MASON REGULATOR COMPANY.

PRESSURE REGULATOR.

Application filed July 14, 1920. Serial No. 396,183.

*To all whom it may concern:*

Be it known that I, GEORGE S. MELCHER, a citizen of the United States, residing at Sharon, county of Norfolk, State of Massachusetts, have invented a certain new and useful Improvement in Pressure Regulators, of which the following is a specification, reference being had therein to the accompanying drawings.

The present invention relates to pressure regulators of the type shown in my prior Patent, No. 1,291,063, patented January 14, 1919, and particularly to the vertical type of regulator shown on Sheet 2, Figure 2 of said patent.

Regulators of this type comprise essentially a diaphragm which is subjected to boiler pressure, lever weighing apparatus which counterbalances the pressure exerted on the diaphragm, a pilot valve actuated by the lever weighing apparatus, and a fluid pressure motor controlled by the pilot valve and serving to open and close the dampers of the boiler or battery of boilers or to control the fan engine or the stoker engine, or other motors of the apparatus which the regulator controls. In said apparatus, a travelling weight which moves lengthwise of the weighing lever is used to effect variations in the counterbalancing pressure exerted by the weighing apparatus.

Heretofore, considerable difficulty has been experienced with apparatus of this kind owing to the fact that changes in the load on the boiler occur suddenly and produce violent actuation of the pressure regulator with the result that the regulation is uneven, and holes are frequently blown in the fire. This difficulty has been accentuated as demands on boilers have increased, much more being demanded of them at the present time than was at the time when the application for said patent was filed. This fluctuation of the power demand is particularly great on large public service power stations and sometimes runs into a thousand or more horse power in a very few minutes.

By careful study and observation of the said apparatus, I have discovered that the sudden and violent operation of the device is seriously increased as the apparatus wears and the lost motion in the parts increases. Apparatus of this kind is placed in boiler rooms or adjacent to them, and is subjected to dust and grit which causes the moving parts to wear rapidly and increases the lost motion and the tendency of the apparatus to operate unevenly.

Accordingly my present invention has for its object to provide apparatus of the type shown in my said prior patent but so constructed that wear and lost motion which may occur will not affect the operation of the device.

The invention will be fully understood from the following description when taken in connection with the accompanying drawings, and the novel features will be pointed out and clearly defined in the claims at the close of this specification.

In the drawings, Fig. 1 is a side elevation partly in section of a device embodying my invention.

Fig. 2 is a side elevation of the double crosshead.

Referring now to the drawings, the diaphragm is shown at 11. It is subjected on its under side to boiler pressure introduced through the pipe 12. This boiler pressure is counterbalanced by the weighing apparatus which includes the lever 13, main weight 14, travelling weight 15 mounted on a carriage 16, pilot valve 17 and fluid motor 18. The fluid motor 18 is provided with a double acting piston 36 having a piston rod 19 which passes through the stuffing box 37 at the upper end of the cylinder. These parts are in general of the construction shown in my prior patent. On the piston rod 19 of the fluid pressure motor 18 is an arm 20 carrying a rod 21 to which is secured a rectangular frame comprised of upper and lower members 22 and 23, and side rods 24 and 25. The rectangular frame straddles the lever 13 and the pilot valve 17. The side rods slide in guides 26 and 27 secured to the frame of the device and the rectangular frame as a whole moves up and down with the piston 36. On the bottom member 23 of the frame and located directly below the weighing lever is a lug 28 to which is attached a chain or other flexible connection 29 which runs over a sheave 30 mounted on a bracket 31 on the lower part of the machine. The other end of the chain is secured to the carriage 16 and opposite to it is secured a chain 32 passing over a sheave 33 on the extreme outer end of the lever 13 and supporting a weight 34. The sheave 33 is carried by a bracket 35 which hangs from the outer end of the lever 13.

In the operation of the device, as the piston of the motor cylinder rises, the weight 34 drops, pulls the carriage 16 and weight 15 along the lever 13 increasing the counterpoising effect of the weight 15. When the piston 36 drops, the rectangular frame is moved down, the chain 29 is pulled down, the weight 15 being pulled toward the fulcrum of the lever 13. It will be seen that throughout the movement of the weight in both directions the sheave 30 is continuously subjected to force which acts at an angle of approximately 45° in the direction indicated by the arrow in Figure 1. Since the force acting on the sheave is always in substantially the same direction regardless of the direction in which the piston 19 is moving, there is no tendency on the part of the sheave to rise and fall in its bearings and wear of these parts will not affect the operation of the device. Furthermore the chain 29 and the chain 32 act opposite to each other in the same horizontal line, and therefore there is no tendency to tilt or rock the carriage 16.

The parts composing my device are also simpler to manufacture, assemble and adjust.

I find that in the actual operation of the device shown herein under wide variations in load of boiler, there is a marked improvement in action, and that the smoothness of action is not appreciably diminished by wear of parts.

What I claim is:—

1. In a regulator, in combination with a diaphragm which is subjected to the pressure to be regulated, a lever which acts on the other side of the diaphragm to resist said pressure, a cylinder with a double acting piston and rod therein, a pilot valve controlling the supply of fluid under pressure to said cylinder, a travelling weight movable on the lever, a rigid member secured to said piston rod outside of the cylinder and extending alongside of the cylinder and extending down below the said lever and movable with said piston rod, a single sheave supported below the lever intermediate the said rigid member and the travelling weight, and a flexible connection secured at one end to the said rigid member and at the other end to the travelling weight, and passing around one side of the sheave and exerting pressure on the sheave in substantially one direction regardless of the direction of movement of the flexible connection.

2. In a regulator, in combination with a diaphragm which is subjected to the pressure to be regulated, a lever to counteract said pressure, a cylinder with a double acting piston and a rod therein, a member rigidly secured to said piston rod outside of the cylinder and extending to a point below the lever, a traveling weight on the lever, a sheave below the lever intermediate the said rigidly secured member and the travelling weight, and a flexible connection between the travelling weight and the bottom of said rigidly secured member, said connection passing over the sheave.

3. In a regulator, in combination with a diaphragm which is subjected to the pressure to be regulated, a lever to counteract said pressure, a cylinder with a double acting piston and a rod therein, a frame secured to said piston rod and straddling the lever, a travelling weight on the lever, a sheave below the lever intermediate the said frame and said travelling weight, and a flexible connection between the travelling weight and the bottom of said frame member, said connection passing over the sheave.

4. In a regulator, in combination with a diaphragm which is subjected to the pressure to be regulated, a horizontal lever to counteract said pressure, a cylinder with a double acting piston and a rod therein arranged vertically above the diaphragm, a rectangular frame secured to said piston rod and straddling the lever, a travelling weight on the lever, a sheave below the lever and above the lower portion of said frame, and a flexible connection extending over the sheave and having one end connected to the travelling weight and the other end to the lower portion of the same frame at a point directly below the lever.

5. In a regulator, in combination with a diaphragm which is subjected to the pressure to be regulated, a horizontal lever to counteract said pressure, a cylinder with a double acting piston and a rod therein arranged vertically above the diaphragm, a rectangular frame secured to said piston rod and straddling the lever, a travelling weight on the lever intermediate its ends, two sheaves, one on the said frame below the lever and closely adjacent the frame, and the other suspended from the said lever below its free end, a second weight, and flexible connections one of which connects the travelling weight to the lower part of said frame and passes over the first mentioned sheave, and the other of which passes over the second mentioned sheave and connects the travelling weight with the second weight.

In testimony whereof I affix my signature.

GEORGE S. MELCHER.